United States Patent [19]

Romberg

[11] 4,222,617
[45] Sep. 16, 1980

[54] SELF LOADING CYLINDRICAL AUTOLUBRICATED GAS BEARING

[75] Inventor: Edgar B. Romberg, Whittier, Calif.

[73] Assignee: Rockwell International Corporation, El Segundo, Calif.

[21] Appl. No.: 394,200

[22] Filed: Sep. 3, 1964

[51] Int. Cl.³ .......................... F16C 7/04; F16C 35/00
[52] U.S. Cl. ........................................ 308/9; 308/122; 308/DIG. 1; 308/DIG. 15
[58] Field of Search ................ 308/9, 122 A, DIG. 1, 308/DIG. 5; 74/5

[56] References Cited

U.S. PATENT DOCUMENTS

| 3,101,224 | 8/1963 | Adams | 308/122 |
| 3,132,906 | 5/1964 | Sternlicht | 308/122 |

Primary Examiner—David H. Brown
Attorney, Agent, or Firm—H. Fredrick Hamann; Rolf M. Pitts

[57] ABSTRACT

A journal-type bearing the shaft member of which is divided into two or more cylindrical sections having their axes offset from each other and from the rotational axis thereof. As the shaft member rotates, viscous forces act upon said cylindrical sections to create a self-induced stabilizing load upon the bearing.

8 Claims, 3 Drawing Figures

SELF LOADING CYLINDRICAL AUTOLUBRICATED GAS BEARING

This invention relates in general to bearing structures and more particularly it relates to the loading of bearings of the autolubricated gas type, and to the means for raising the onset of "half-frequency whirl" in this type of bearing. By raising the onset, or in other words the frequency at which it occurs, of "half frequency whirl" above the operating range of the bearing, we can for all practical purposes eliminate its occurrence; provision of a satisfactory bearing for the rotors of precision instruments, and in particular for the rotors of precision gyroscopes, is a very serious problem. The principal requirements for rotor bearings in precision gyroscopes are: consistency of elastic properties, freedom from vibration, long life, and self servicing. In addition, simplicity and low cost are important requirements.

Bearing vibration in a precision gyroscope sets a limit upon the degree to which dynamic balance is obtained and gives rise to disturbing torques. In addition, vibration components obscure the precession of the gyroscope. Vibration in the gyroscope also results in wear of components.

Auto-lubricated gas type bearings are finding wide spread application in the support of rotors on precision gyroscopes, due to many attractive features, such as low and constant friction, no contamination from lubricants, high reliability, and hence infinite life under constant operation. Under actual operation, autolubricated gas bearings frequently become unstable. This instability appears as a whirling of the bearing shaft with a rapidly increasing amplitude and with subsequent destruction to the bearing. This whirling instability occurs at slightly less than half the rotor speed and hence is called "half-frequency whirl". Various attempts have been made to raise the onset of this instability by preloading the bearing. Efforts in the present state-of-the-art are to increase the rotor weight and thereby load the bearing.

Gas bearings are known, in which the pressure of the supporting gas in the bearing gap, like the pressure in the oil film of a hydrodynamically lubricated bearing, is built up by the rotary movement of the shaft due to viscosity forces. In these bearings, there is a possibility that the member carried by the gas film or gas cushion, due to the compressibility of the gas in the bearing gap and particularly in the relatively large distribution spaces, will be set in vibration, either through self-excitation or through the effects of external interfering forces, such as unbalance. The present invention prevents the onset of "half-frequency whirl" even when the bearing is unloaded and does not reduce the stiffness and ultimate load carrying ability of the bearing. The present state-of-the-art is to prevent whirl in plane cylindrical bearings by machining grooves, or flats on the cylindrical surfaces. These solutions drastically reduce the load carrying ability of the bearings and increase their compliance. The novel structure disclosed herein is to build the cylindrical gas bearing in two or more sections, which are slightly eccentric with respect to each other, thereby loading one section of the bearing against another. Each of the bearing sections then operates with a slight eccentricity.

Accordingly, the principal object of this invention is to provide a bearing structure for high speed applications in which the onset of half-frequency whirl is raised above the operating frequency of the bearing.

Another object of this invention is to provide a bearing structure which causes self loading.

Still another object of this invention is to provide a gas autolubricated cylindrical bearing characterized by its extreme rigidity and lack of vibration.

An object of this invention is to provide an autolubricated cylindrical gas bearing suitable for use in scientific instruments.

It is another object of this invention to provide an instrument gas bearing whose vibration is substantially less than any known hydrodynamic gas bearing heretofore known.

Other objects of the invention will become apparent from the following description taken in connection with the accompanying drawings in which.

Figure 1:
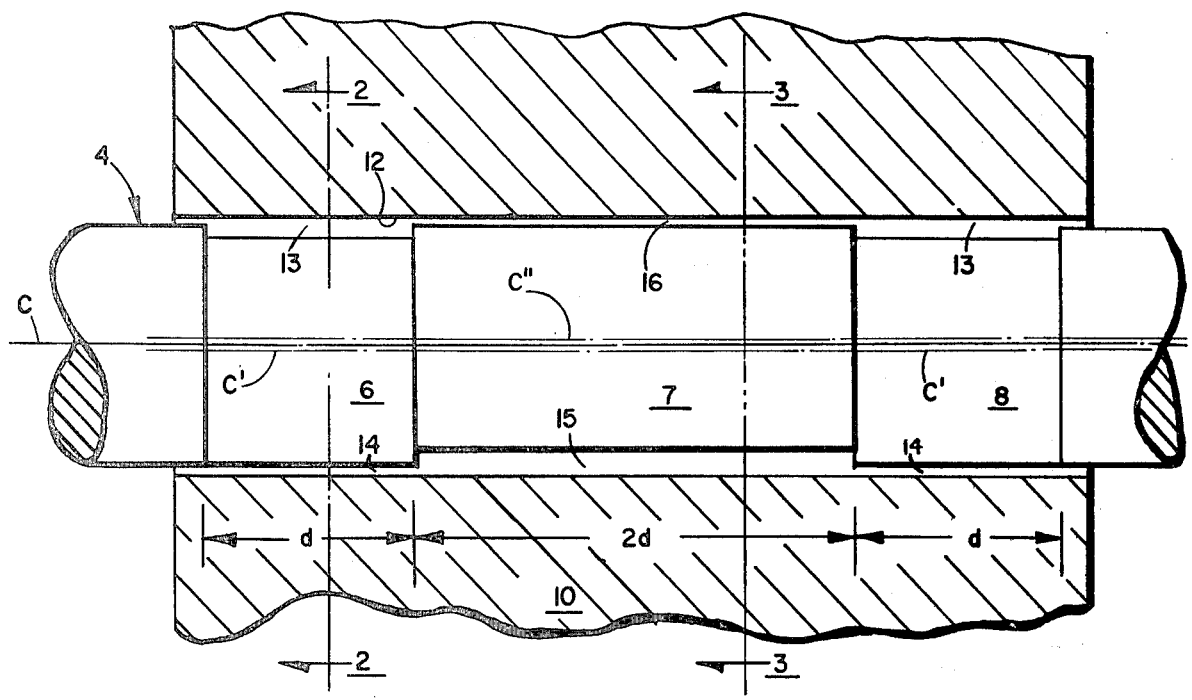
FIG. 1 is a side section view of a preferred embodiment of this invention.

Referring to FIG. 1, there is shown a shaft 4, hydrodynamically supported in a bearing 10. The bearing is designed, enveloping said shaft, so that under load a wedged shaped gap exists between the shaft 4 and the bearing 10. Gas at relatively low pressure in larger gaps, such as 13 and 15, is squeezed by viscous drag into the narrow gaps, such as 14 and 16, thereby generating pressure or lift. The ability of a fluid to provide a hydrodynamic wedge is particularly the result of the viscosity and density of the fluid whereby the fluid resists changes in shape; also aiding in the creation of the wedge is the eccentricity and velocity of the shaft relative to the bearing. The eccentricity produces an additional converging area in which high pressures are also developed.

The shaft 4 is rotatably mounted within bearing 10 about an axis of rotation defined by axis C. Located parallel to and positioned on opposite sides of axis C are axes C' and C''. Axes C' and C'' are spaced equal distances from axis C. The shaft 4, having a diameter $D_1$, is comprised of at least three eccentric sections 6, 7 and 8. These sections are eccentrically mounted with respect to the shafts' rotational axis C. Sections 6 and 8 are symmetrically mounted with respect to axis C', while section 7 is symmetrically mounted with respect to axis C''. Section 6 is equal in length d to section 8 and section 7 is equal in length, 2d to sections 7 and 8 combined.

Figure 2:
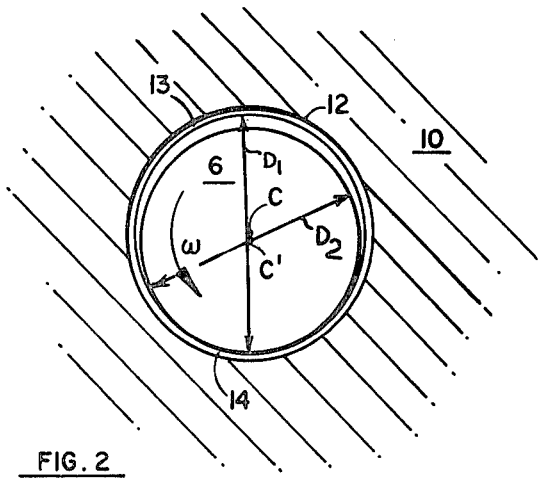
FIG. 2 is a section view taken at the section 2—2 of FIG. 1.

Sections 6 and 8 form right circular cylinders having an axis of symmetry defined as C' and also having a diameter $D_2$. Section 7 forms a right circular cylinder having its axis of symmetry defined as C'', and having a diameter equal to $D_2$. The diameter $D_1$ of shaft 4 is slightly greater than the diameters $D_2$ of sections 6 and 8. It is to be understood that the center cylinder part 7 need not be the same diameter as the end cylinders 6 and 8. FIG. 2 discloses a sectional view taken from FIG. 1 at points 2—2. With the shaft 4 rotating at a relatively high rate of speed $\omega$ (angular frequency), a first pressure area will be set up in the gap 13 and a second pressure area will be set up in the gap 14. Due to the eccentric mounting of member 6, the pressure in gap 14 will be greater than the pressure in gap 13. This will also be true for section 8. This difference in pressure tends to force the sections 6 and 8 to assume a rotational center which will equalize the pressure in the gaps.

Figure 3:
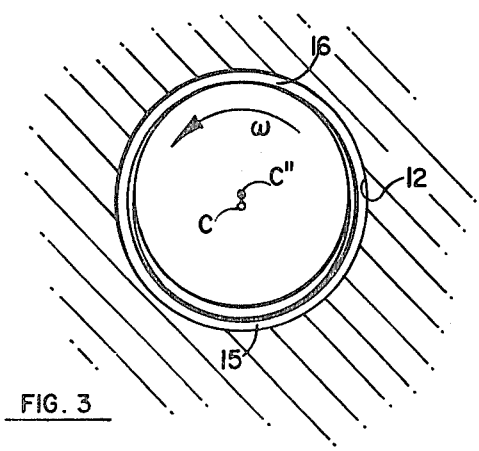
FIG. 3 is a section view taken at the section 3—3 of FIG. 1.

Referring to FIG. 3, there is shown a sectional view taken along the line 3—3 of shaft 4. In operation, when shaft 4 is rotated at high rates of speed, a first pressure zone 15 and a second pressure zone 16 is generated by the eccentrically mounted section 7. The pressure in zone 16 is greater than the pressure in zone 15, and this difference in pressure tends to force the section 7 to define a new rotational center located such that the pressure in zones 15 and 16 are equalized.

For the purposes of clarity, it will be assumed that these forces are acting on the shaft 4 while the shaft is stationary, although in operation the forces are rotating along with the shaft. Referring back to FIG. 1, it can be seen that the pressure in gaps 14 are equal and opposite to the pressure in gap 16. The pressure differential of sections 6, 7 and 8 tends to load these sections one against another which has the effect of continually keeping the bearing under load throughout its running condition. By self-loading the bearing, the onset of "half-frequency whirl" is raised to such a value that throughout the operating range of the shaft this phenomena does not occur.

While there has been described a preferred embodiment of the present invention, it will be appreciated that the invention is not limited thereto but that various modifications may be made without departing from the scope of the appended claims.

I claim:

1. In a self-loading hydrodynamic bearing, a cylindrical shaft rotatable about a first axis comprised of at least three right circular cylindrical members each having a diameter slightly less than the diameter of said shaft, a second and third axis parallel to said first axis and positioned an equal distance on opposite sides of said first axis, two of said cylindrical members being symmetrically mounted about said second axis, and said third cylindrical member symmetrically mounted about said third axis, a bearing member having a diameter slightly greater than the diameter of said cylindrical shaft enveloping said shaft, a gas located between said shaft and said bearing, rotation of said shaft causing the generation of high pressures in the converging areas between said shaft and said bearing, the resulting forces of said high pressure areas acting upon said shaft to stabilize said shaft in said bearing to substantially limit the movement of the axis of said shaft during rotation thereof.

2. The combination according to claim 1 in which two of said cylindrical members have a length equal to one-half the length of said third member.

3. In a hydrodynamic gas bearing, a shaft member, a bearing member, said shaft member comprising a plurality of cylindrical bearing surfaces, the axis of rotation of said shaft being displaced from the axis of said cylindrical bearing surfaces said surfaces being relatively disposed so as to carry loads in different directions with respect to each other.

4. In a hydrodynamic gas bearing, a shaft member, a bearing member, said shaft member having a plurality of curved bearing surfaces each having a center of curvature, the axis of rotation of said shaft being displaced from the center of curvature of said surfaces, and said curved bearing surfaces being disposed to carry loads in different directions with respect to each other.

5. In an hydrodynamic gas bearing, a shaft member, a bearing member, said shaft member comprising a plurality of cylindrical bearing surfaces at least two of which are eccentrically mounted with respect to each other.

6. In an hydrodynamic gas bearing adapted for use in an high speed precision gyroscope, a shaft member, a bearing member, said shaft member comprising a plurality of cylindrical bearing surfaces at least two of which are eccentrically mounted with respect to each other and the axis of rotation of said shaft member being displaced from the axes of said cylindrical bearing surfaces.

7. An hydrodynamic gas bearing comprising,
a shaft member having a plurality of bearing surfaces defined by cylindrical sections the axes of which are eccentrically located with respect to the rotational axis of said shaft member,
a bearing member having an internal, single-axis, cylindrical surface for receiving said shaft member,
a gas within said bearing member providing lubrication between such member and said bearing surfaces of said shaft member during rotation thereof,
said gas cooperating with said bearing member and said bearing surfaces to create counterbalancing forces upon said shaft member thereby stabilizing said shaft member.

8. In combination,
a high speed, precision gyroscope having a shaft,
an autolubricated gas bearing attached to said shaft and comprising,
a shaft member having a plurality of bearing surfaces defined by cylindrical sections the axes of which are eccentrically located with respect to the rotational axis of said shaft,
a bearing member having an internal, single-axis, cylindrical surface for receiving said shaft member,
a gas within said bearing member providing lubrication between such member and said bearing surfaces of said shaft member during rotation thereof,
said gas cooperating with said bearing member and said bearing surfaces to create counter-balancing forces upon said shaft member thereby stabilizing said shaft member.

* * * * *